Oct. 19, 1954  R. L. HASCHE  2,692,131
REGENERATOR PACKING CONSTRUCTION
Filed July 2, 1952  2 Sheets-Sheet 1
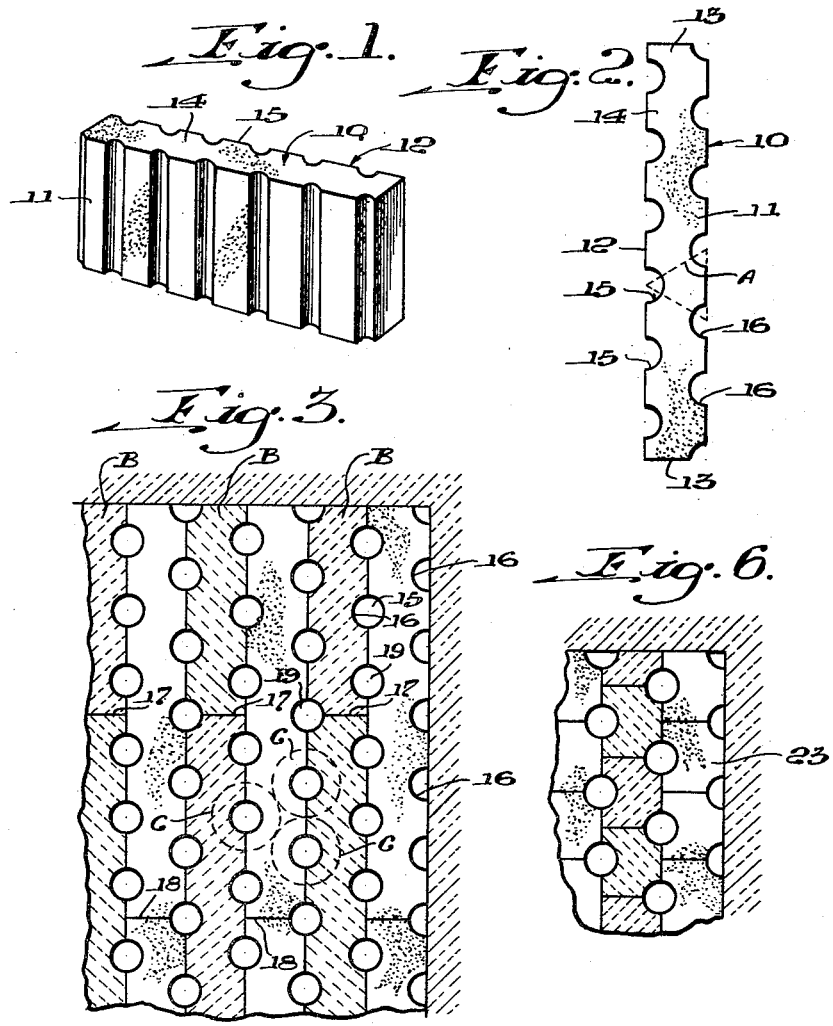
INVENTOR.
RUDOLPH L. HASCHE.
BY
his ATTORNEY.

Oct. 19, 1954 R. L. HASCHE 2,692,131
REGENERATOR PACKING CONSTRUCTION
Filed July 2, 1952 2 Sheets-Sheet 2

INVENTOR.
RUDOLPH L. HASCHE.
BY Sendall C Bronstein
his ATTORNEY.

Patented Oct. 19, 1954

2,692,131

UNITED STATES PATENT OFFICE 2,692,131

REGENERATOR PACKING CONSTRUCTION

Rudolph L. Hasche, Johnson City, Tenn., assignor to Carbonic Development Corporation, a corporation of Delaware Application July 2, 1952, Serial No. 296,911

11 Claims. (Cl. 263—51)

This invention relates to regenerator packing construction used to cool and heat gases. The gases are periodically heated and cooled by transfer of heat from one stream of gas to the regenerator packing and retransfer therefrom to another stream of gas.

The present invention relates particularly to packing units from which the mass of heat-holding material is formed and to an assembly of such units.

This application is a continuation in part of applicant's application Serial No. 129,969 filed November 29, 1949, now abandoned.

The great disadvantage of regenerator masses heretofore known is that the ratio of void volume to the volume of the solid mass is generally very large, which requires either short cycles or large volumes of packing and low velocity of the gas streams therethrough. Attempts have been made to circumvent these disadvantages by making a metal packing with a very large surface area, thereby increasing the rate of heat transfer. As an example, regenerators built for liquid oxygen plants were packed with aluminum disks or coils of aluminum strips to provide the necessary large surface area. However, weaknesses still exist in such constructions since they require a very large total regenerator volume and are limited to use with gas streams of low velocity.

The present invention provides a regenerator mass comprised of a plurality of identical units or "bricks" of rectangular shape that may be intimately stacked to completely fill the available space. The opposed faces of the bricks are provided with grooves extending thereacross so that in the final assembly, grooves of adjacent faces will lie in registry to define flue passageways through the mass.

It is therefore an object of this invention to provide a regenerator packing unit of simple and economical construction.

It is another object of this invention to provide a regenerator packing establishing a large mass-to-void ratio.

It is another object of this invention to provide a regenerator packing construction wherein substantially the entire solid mass of each packing unit is active and wherein relatively low temperature differentials between different portions of a unit are involved to thereby prolong the life of the installation by the prevention of spalling.

It is a still further object of this invention to provide a unit for the construction of regenerator packings and which unit is readily adaptable to many shapes of furnaces or available enclosures.

It is still another object of this invention to provide a regenerator packing mass composed chiefly of identical units arranged to lock the entire mass together.

Still another object of the invention is the provision of a regenerator packing for use with gas streams of high velocity wherein it is desired to maintain flow with little or no pressure drop through the furnace.

Additional objects and advantages will become apparent to those skilled in the art as the description proceeds in connection with the accompanying drawings, wherein:

Fig. 1 is a perspective view of a preferred embodiment of the present invention;

Fig. 2 is a plan view of the unit shown in Fig. 1;

Fig. 3 is a horizontal sectional view, taken along the line 3—3 of Fig. 4, through an assembled mass of the units of Fig. 1;

Fig. 6 is a sectional view, similar to Fig. 3, but showing a further modified form of unit.

Figure 4:
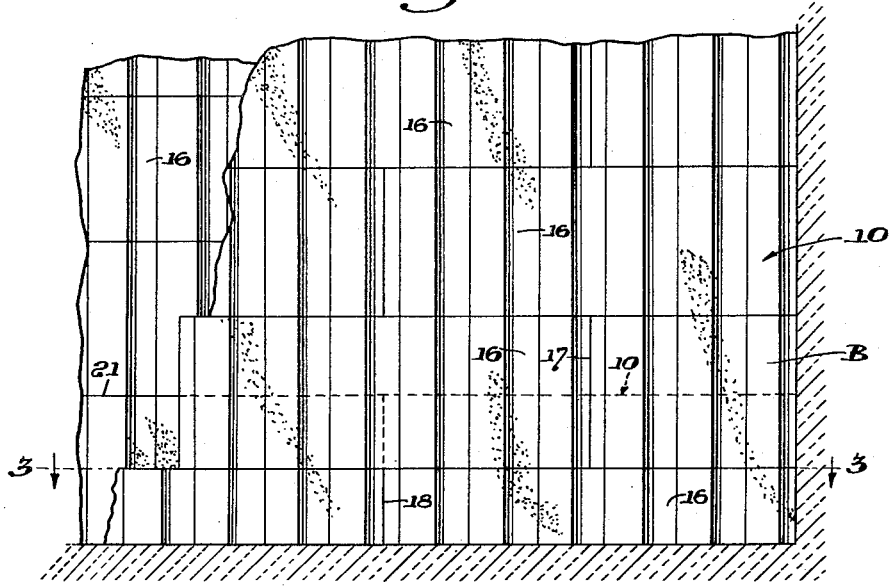
Fig. 4 is a side elevational view of an assembled mass as seen from the right of Fig. 3 with parts of the foremost row broken away.

The unit or block of the present invention, as shown in Figs. 1 and 2, comprises a rectangular block or brick 10 of suitable heat-resisting material formed with relatively large opposed parallel faces 11 and 12 and relatively narrow edge surfaces 13 and 14. The opposed flat parallel faces 11 and 12 are each provided with a plurality of parallel straight grooves 15 and 16, each groove being substantially semi-cylindrical in transverse section and extending completely across the face of the block. The spacing between the grooves is uniform and the grooves are "staggered," that is, the grooves 16 in one of the faces lie with their axes half-way between the axes of the grooves 15 in the other face, all as is clearly apparent from an inspection of Fig. 2. A further feature of the unit lies in the fact that the grooves 16 are all spaced apart equal distances and the distance between adjacent grooves 16 is equal to the distance between any one of the grooves 16 and the nearest groove 15 in the opposite face, when measured through the block. That is, the axes of two grooves in one face and the adjacent groove in the opposed face lie on the apexes of an equilateral triangle, as indicated at A in Fig. 2.

The relative proportions of the units may be altered materially but are preferably relatively thin in comparison to their length and height.

The units just described may be readily assembled into a mass as shown in Fig. 3 wherein alternate rows of abutting blocks include a short or half-length brick B at an end thereof so that the joints 17 in those rows are in staggered relation to the joints 18 in the other rows which have full length bricks or units at the ends adjacent the units B. The blocks B need not be exactly half the length of the standard or full length blocks but may be any suitable fraction thereof. Preferably, however, the length of blocks B will be an even multiple of the distance between grooves in the blocks.

As is clearly evident from Fig. 3, the grooves 15 in one of the units are positioned in registry with the grooves 16 of the next adjacent block, thereby defining a vertical passageway through the mass. As previously described, the spacing between the grooves is such that the distance between the passageways or flues 19 is the same in all directions, the flues being arranged in parallel rows and the flues in each row being staggered relative to those in the adjacent rows. The dotted line circles C in Fig. 3 indicate the pattern of heat penetration into the mass of material from hot gases passing through the flues, in a given period of time and illustrate the fact that since the transfer of heat from the gases to the mass is equal in all directions, substantially the entire mass of material will become heated to the same temperature at the same time with little, if any, material being left at a lower temperature. This is an important feature since it utilizes the full mass of solid material at its greatest efficiency and avoids large temperature differentials in any unit. Such large temperature differentials, when periodically repeated, result in failure or spalling of the bricks and necessitates their frequent replacement.

Fig. 4 illustrates a further feature of the present invention wherein the units are adapted to be assembled in tiers and wherein the horizontal joints in adjacent rows are vertically staggered. As shown in Fig. 4, the lowermost units of the row in the forefront are only one-half the height of the remaining units in the mass. Thus, the horizontal joint 20 between the first and second tiers of the foremost row is at a different elevation than the joint 21 between the first and second tiers of the second row back. By combining bricks of half height with bricks of full height and using the half-height bricks in alternate rows, a completely interlocked assembly may be made. It will be noted that in the structures, all joints are staggered, that is, joints between tiers and joints between bricks in adjacent rows and also the vertical joints between bricks in the same row.

It is not necessary that the lower bricks be exactly half the height of the full sized units but may be any other suitable fraction thereof, or may even be of a greater height. It is preferred that the short bricks be about half the length of the full sized units and that the low bricks be about one-half the height of the full sized units, thus necessitating only three different sizes of units.

Figure 5:
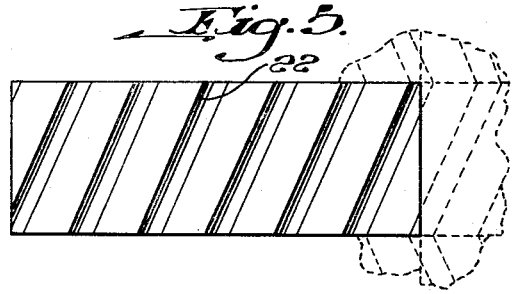
Fig. 5 is a side elevational view of an alternative form of unit.

Fig. 5 illustrates an alternative construction wherein the grooves 22 may extend diagonally across the opposed faces of the units. In all other respects, the unit of Fig. 5 is similar to that of Fig. 1. The grooves on the remote or far side of the unit of Fig. 5 will extend in a direction parallel to those shown at 22 but in staggered relation thereto. Such units may be assembled to define sinuous passageways through the mass in the event such sinuous passageways are desired.

Fig. 6 illustrates a still further modified form of unit wherein the "length" of each block 23, measured in the horizontal direction along the rows, is equal to the spacing between grooves. Clearly the units of Fig. 6 may be assembled in the same manner as shown in Fig. 3 and will provide a mass having the same characteristics but having the advantage of being adaptable to enclosed space of non-rectangular or other irregular shape without the necessity of cutting the larger units to size.

The unit or brick constructed in accordance with the present disclosure is extremely economical to produce since it includes no passageways through the units, which involve high production costs due to the necessity of providing cores or the like during fabrication. The units of the present invention may be readily pressed or molded from the desired materials and the grooves across the opposed faces are all of such configuration that the portions of the mold forming these grooves may be readily withdrawn, having ample "draft" for that purpose.

The grooves need not be semi-cylindrical in shape but may be of polygonal cross-section if desired. It is preferred that the semi-cylindrical shape be employed, however, since the heat distribution through the mass is more nearly uniform and complete when such grooves are employed.

The materials from which the units are constructed may be any material suitable for the particular installation, for example, they may be made of cast iron, aluminum, copper or any alloy of metals where the temperatures involved are not extremely high. For high temperature installations, the units may be readily made of fused alumina or Carborundum. The dimensions of the shapes may vary, depending upon the conductivity of the material and the particular installation. There is, however, a definite relationship between the spacings of the flues and the mean thermal conductivity of the material. For example, with cast iron, aluminum, copper or brass, the flues may be from $3/8''$ to $3/4''$ in diameter and be peripherally spaced from $1''$ to $2''$ apart, but as low as $3/8''$ apart. In the case of Carborundum, the flues may be preferably from $1/4''$ to $1/2''$, but as high as $3/4''$, in diameter and be peripherally spaced apart from $1''$ to $1 1/2''$, but as low as $3/8''$ apart. Where the material employed is alumina, with a heat conductivity of about one-quarter that of Carborundum, the flues may have a diameter of from $1/4''$ to $1/2''$ and be peripherally spaced apart from $3/8''$ to $5/8''$.

In order to conform with the requirements of the present invention there is a limiting relationship between the mean thermal conductivity of material comprising the units and the peripheral spacing of the flues. The ratio of mean thermal conductivity, in B. t. u. per square foot per inch per hour per degree Fahrenheit, to the distance between flues, expressed in inches, should be greater than 40.

Preferentially, for high temperature installations, the unit of the present invention comprises a rectangular block of refractory material comprising a material selected from the group consisting of alumina and Carborundum, both of which are well known heat resisting, high temperature refractory materials having high fusion points, each of two opposed faces of such block being provided with substantially straight and substantially parallel grooves extending completely thereacross, the grooves in each of said opposed faces being staggered with respect to the grooves in its opposed face, each of said grooves having a maximum straight cross sectional dimension not greater than ¾" in any direction and being spaced apart from adjacent grooves in the same face and adjacent grooves in its opposed face a distance not less than ⅜", the ratio of the mean thermal conductivity of said refractory material to the distance between said grooves being greater than 40 when the said conductivity is expressed as B. t. u. per square foot per inch per hour per degree Fahrenheit and the said distance is expressed in inches.

However, as between alumina and Carborundum refractories the former is preferred, since it is more resistant to deterioration in high temperature installations.

Furthermore, although the maximum straight cross-sectional dimension of the grooves or the flues should not be any greater than ¾", as stated above, the most economical furnace is obtained if such dimension is not greater than ½". This is especially true with alumina refractories in which case the preferred maximum straight cross-sectional dimension of the flues as stated above is from ¼" to ½".

By employing units constructed in accordance with the present disclosure, an assembled mass may be constructed having a ratio of solid mass to voids of more than 10 to 1, which is a ratio impracticable to attain with any other known construction.

One important use of this type of packing is in the cooling of gases for liquefaction or gas separation purposes. For example, in the production of oxygen, regenerators are useful for cooling the gas to a sufficient degree to freeze out on the mass, moisture, carbon dioxide and acetylene. In cooling of the gas under compressed condition in the order of —100° C. or lower, the regenerative mass allows the removal of these constituents without the use of adsorbents or chemical agents. Likewise, it is useful in the production of solid carbon dioxide or Dry Ice. In one method, compressed gas such as flue gas containing carbon dioxide is cooled in the regenerator to approximately —80° C. thereby freezing out the moisture in the mass and the gas then enters an expanding engine doing external work, whereby solid carbon dioxide is thrown out and collected in bag filters and cold gas then returns to a regenerator to give up its refrigeration, two regenerators working alternately.

Another application is in a regenerator for recovery of heat from process gases and transferring it by alternating regenerators to preheat combustion air. The packing is also useful in regenerative furnaces for carrying out endothermic gas reactions, for example, in the production of heating gas by partial combustion of hydrocarbons with air. A particularly useful application of the packing is in the cracking of hydrocarbons to olefins and acetylene where very short contact times are required. By this packing, which contains a very large percentage of solid mass compared to void volume, contact times far shorter than any heretofore possible are obtainable. For example, it is possible to obtain contact times as low as 1/100 of a second and still maintain a cycle time sufficiently long to be practicable.

The present invention has further particular advantages when employed in processes involving the condensation of constituent portions of the gas. When such condensation takes place within the flues of the present disclosure, the condensed liquids can readily drain from the mass due to the smooth and continuous nature of the passageways. There are no devious paths for the liquids to follow and no overhanging portions from which they must drip. The vertical passageways of Figs. 3 and 4 are particularly advantageous in this respect.

Although a preferred embodiment of the invention has been shown and described herein, it is to be understood that this description is merely illustrative and not limiting; that the invention is to be limited only by the scope of the appended claims.

I claim:

1. A heat regenerative unit comprising a solid rectangular block of a material selected from the group consisting of cast iron, aluminum, copper and brass, each of two opposed faces of said block being provided with substantially straight and substantially parallel grooves extending completely thereacross, the grooves in each of said opposed faces being staggered with respect to the grooves in its opposed face, each of said grooves having a maximum straight cross-sectional dimension not greater than ¾" in any direction, having a peripheral cross-sectional shape polygonally approaching and including a curvilinear shape and being spaced apart from adjacent grooves in the same face and adjacent grooves in its opposed face a distance not less than ⅜", the ratio of the mean thermal conductivity of said material to the distance between said grooves being greater than 40 when the said conductivity is expressed as B. t. u. per square foot per inch per hour per degree Fahrenheit and the said distance is expressed in inches.

2. The unit of claim 1 wherein said peripheral cross-sectional shape of said grooves is circular.

3. A heat regenerative unit comprising a solid rectangular block of a material selected from the group consisting of cast iron, aluminum, copper and brass, each of two opposed faces of said block being provided with substantially straight and substantially parallel grooves extending completely thereacross, the grooves in each of said opposed faces being staggered with respect to the grooves in its opposed face, each of the grooves in each of said faces being substantially equidistantly spaced from adjacent grooves in the same face and the two closest adjacent grooves in its opposed face, each of said grooves having a maximum straight cross-sectional dimension not greater than ¾" in any direction, having a peripheral cross-sectional shape polygonally approaching and including a curvilinear shape and being spaced apart from adjacent grooves in the same face and adjacent grooves in its opposed face a distance not less than ⅜", the ratio of the mean thermal conductivity of said material to the distance between said grooves being greater than 40 when the said conductivity is expressed as B. t. u. per square foot per inch per hour per degree Fahrenheit and the said distance is expressed in inches.

4. A heat regenerative mass comprising a mass of a material selected from the group consisting of cast iron, aluminum, copper and brass having staggered rows of substantially straight, substantially parallel flues passing therethrough, each of said flues having a maximum straight cross-sectional dimension not greater than ¾" in any direction, having a peripheral cross-sectional shape polygonally approaching and including a curvilinear shape and being spaced apart from adjacent flues in the same and adjacent rows a distance not less than ⅜″, the ratio of the mean thermal conductivity of said material to the distance between said flues being greater than 40 when said conductivity is expressed as B. t. u. per square foot per inch per hour per degree Fahrenheit and the said distance is expressed in inches.

5. The mass of claim 4 wherein each of said grooves or flues is substantially equidistantly spaced from adjacent flues in the same row and the two closest adjacent flues in adjacent rows.

6. The mass of claim 4 wherein said peripheral cross-sectional shape is circular.

7. The mass of claim 4 comprising a plurality of solid rectangular blocks of said material arranged in face to face relation to completely fill a predetermined space, said blocks being arranged in abutting rows, each row consisting of superimposed tiers of said blocks, said flues being defined by complementary aligned grooves in opposed faces of said blocks.

8. The mass of claim 7 in which the blocks are cast iron.

9. The mass of claim 7 in which the blocks are aluminum.

10. The mass of claim 7 in which the blocks are copper.

11. The mass of claim 7 in which the blocks are brass.

References Cited in the file of this patent

UNITED STATES PATENTS

| Number | Name | Date |
|---|---|---|
| 2,172,714 | Schack et al. | Sept. 12, 1939 |
| 2,506,244 | Stopka | May 2, 1950 |
| 2,509,168 | Rice | May 23, 1950 |
| 2,622,864 | Hasche | Dec. 23, 1952 |

FOREIGN PATENTS

| Number | Country | Date |
|---|---|---|
| 144,043 | Austria | Sept. 23, 1903 |
| 640,458 | France | May 1, 1930 |

OTHER REFERENCES

Page 508 of "Refractories," Third Ed. 1949 by F. H. Norton, published by the McGraw-Hill Book Co., Inc., New York, N. Y.

Pages 795, 796 and 799 of "Process Heat Transfer," First Ed. 1950 by D. O. Kern, published by McGraw-Hill Book Co., Inc., New York, N. Y.

Pages 357, 358, 359, 360 and 361 of "Modern Furnace Technology" 1938 by H. Etherington, published by Charles Griffin and Co., Ltd., London, England.